United States Patent [19]

Krug

[11] Patent Number: 4,696,586

[45] Date of Patent: Sep. 29, 1987

[54] WIRE ROLL BEARING

[75] Inventor: Ulrich Krug, Hagen, Fed. Rep. of Germany

[73] Assignee: Hoesch Aktiengesellschaft, Fed. Rep. of Germany

[21] Appl. No.: 924,133

[22] Filed: Oct. 27, 1986

Related U.S. Application Data

[63] Continuation of Ser. No. 783,418, Oct. 3, 1985, abandoned.

[30] Foreign Application Priority Data

Oct. 4, 1984 [DE] Fed. Rep. of Germany ....... 3436406

[51] Int. Cl.⁴ ............................................. F16C 33/61
[52] U.S. Cl. ................................... 384/500; 384/501; 384/611; 384/615; 384/49
[58] Field of Search ............... 384/500, 501, 581, 535, 384/49, 611, 615

[56] References Cited

U.S. PATENT DOCUMENTS

| | | | |
|---|---|---|---|
| 1,204,938 | 11/1916 | Chapman | 384/500 |
| 1,340,310 | 5/1920 | Wolff | 384/501 |
| 3,533,497 | 10/1970 | Rojewski | 384/501 |

Primary Examiner—Lenard A. Footland

[57] ABSTRACT

In order to provide a wire roll bearing with slide and guideway (2), and roll bodies arranged therebetween on running wires (3), with said running wires (3) being shiftably arranged in the wire bed (5), where any kind of shape is possible of the running wire and the bearing, any desired curvings can be simply produced and even one-sided shifting of the running wire (3) can be equalized, the running wires (3) are tensioned at one end or at both ends by the interposition of spring means (6,7).

4 Claims, 4 Drawing Figures

WIRE ROLL BEARING

This is a continuation of co-pending application Ser. No. 783,418 filed on Oct 3, 1985, abandoned.

The invention relates to a wire roll bearing with slide and guideway and therebetween roll bodies arranged on running wires, whose running wires are shiftably arranged in wire beds.

Such wire roll bearings serve as guiding elements between movable parts. They can be used as straight or curved guides. The running wires are shiftably arranged in the wire beds, because wire and wire bed are normally of different material and thus have a different coefficient of expansion.

In a wire roller bearing according to DE-PS No. 27 29 354 the object is to keep the running wires moving in the wire bed, however preventing them from falling out of the wire bed by means of a larger diameter of the groove which substantially surrounds the running wires. In this embodiment only wire beds for straight guiding can be manufactured with regular fabrication means. Furthermore, the described beds cannot be used for semi-round wires, which are, for example, utilized in cross roller bearings.

Moreover, it is known that the running wires stray within the wire bed by overrunning of the roll bodies under load. This straying is caused by the moving bending of the running wire below the roll body and can under a great load be so strong that the wire cannot be fixed by mechanical means. Upon alternate forward and rearward movement of linear and curved wire roll bearings under equal load, the straying of the running wire would always be equalized so that the running wire would in every case return to central position when it is sufficiently free at the ends. If, however, the wire bed is always only loaded in one direction and is not put under load in the other direction, such equalization does not occur so that the wire is shifted only in one direction.

It is an object of the invention to provide a wire roll bearing of the present type where any kind of shape is possible of the running wire and the bearing, any kind of curvings can be simply produced and even one-sided shifting of the running wire can be equalized.

According to the invention, this object is attained in that the running wires are tensioned at one end or at both ends by the interposition of spring means. Other preferred embodiments of the invention are set forth in the dependent claims.

The advantages attained under the invention consist in particular in the fact that the improved wire roll bearings can be produced for all bearing and wire shapes. As distinguished from the state of the art, the expenditure of energy is substantially reduced since the wire beds must not be manufactured any more in undercut form. It has further proved advantageous that through the bilateral tensioned fixing the running wire always returns to the central position during operation where it is preferably not fixed at one part of the bearing, as distinguished from known embodiments.

Preferred embodiments of the invention are schematically shown in the drawings and are described in detail below.

Figure 1:
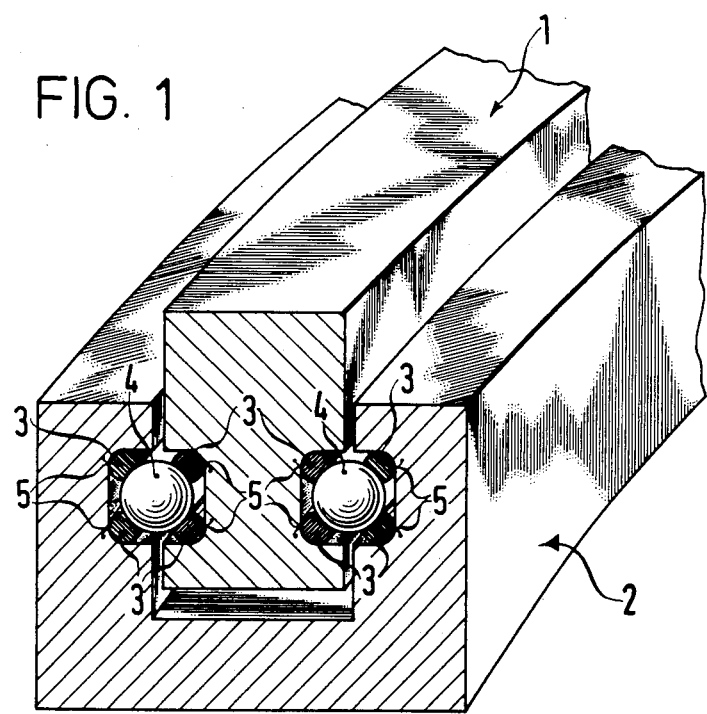
FIG. 1 shows a segment of a wire roll bearing which is formed as a circle segment bearing.

The wire roll bearing according to FIG. 1 consists of a slide 1 and a guideway 2. Therebetween, roll bodies 4 are arranged which roll on running wires 3 and are formed here as spheres. The running wires are inserted into wire beds 5. These wire beds are worked into the slide and the guideway without undercutting.

Figure 2:
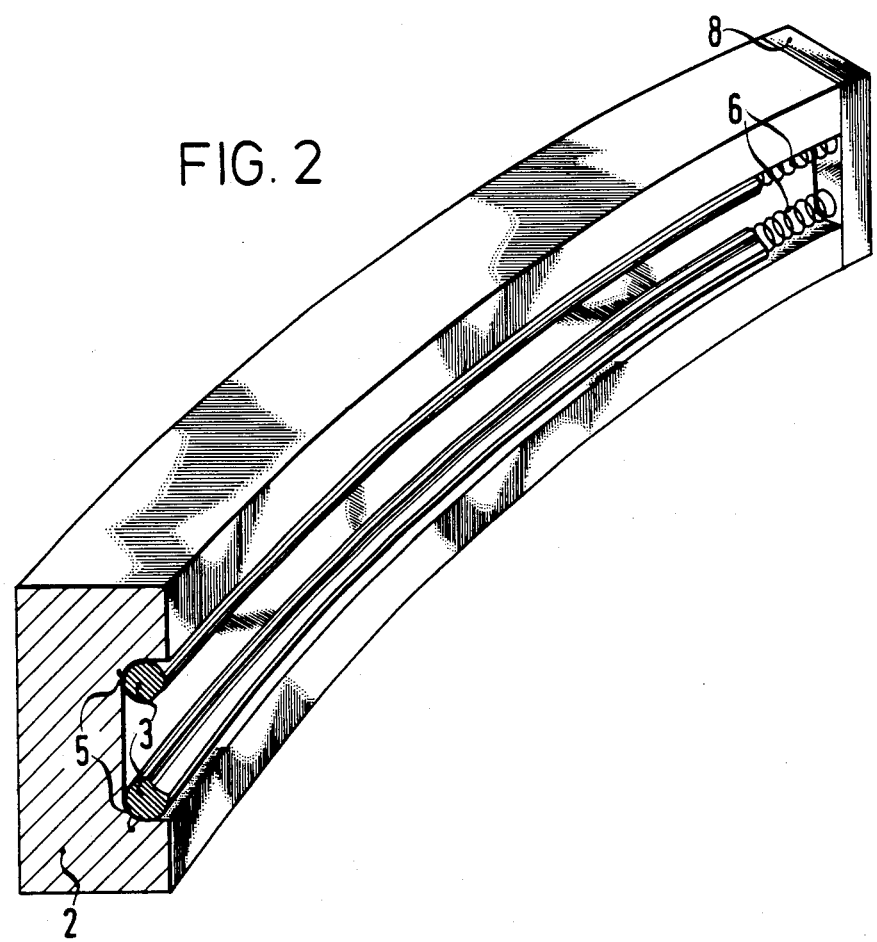
FIG. 2 illustrates a guide way of a wire roll bearing according to FIG. 1 with a concave curving.
Figure 3:
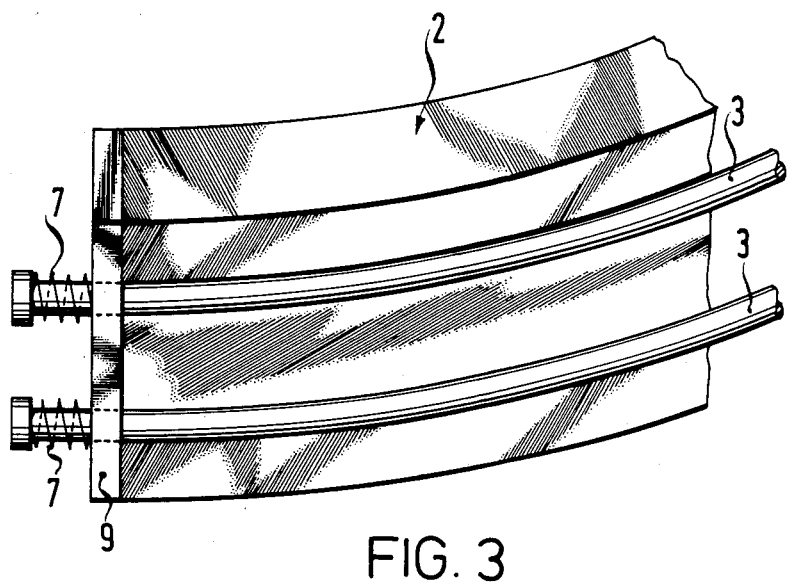
FIG. 3 shows the terminal area of a guideway of a wire roll bearing according to FIG. 1 with a concave curving.

At the ends of the running wires, spring elements 6, 7 are arranged as shown in FIGS. 2 and 3. Thereby, the running wires are compressed by compression springs 6 in a wire bed with concave curving (FIG. 2) and receive a tractive force by a compression spring 7 in a wire bed with a convex curving (FIG. 3).

It is thereby in both cases guaranteed that the running wires always follow their wire beds and can carry out longitudinal shifting by cooperation with the compression springs 6 or 7, which are supported on the guide plates 8 and 9.

Figure 4:
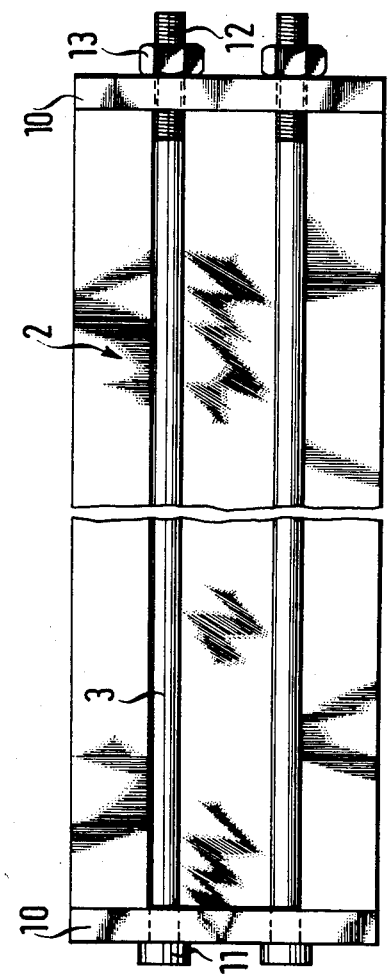
FIG. 4 illustrates a straight guideway of a linear bearing.

In case of running wires of great length (FIG. 4), the elasticity of such running wires can be utilized, and a pre-tensioning of the wires by means of spring means can be dispensed with. The running wire 3 is guided through a bore (not shown) in a guide plate 10 at the end of the guideway 2. It has at one side a head 11 and at the other side an enlarged threaded part 12 and is tensioned as much as needed by means of a nut 13.

We claim:

1. Wire roll bearing with slide and guideway and therebetween roll bodies arranged on running wires, with the running wires being movably positioned in the wire bed, characterized in that the running wires are tensioned at least at one end in compression or tension by the interposition of spring means, and further characterized by being structured as a circle segment bearing.

2. Wire roll bearing according to claim 1, characterized in that the tension is a compressive force.

3. Wire roll bearing according to claim 1, characterized by being structured as a circle segment bearing.

4. Wire roll bearing according to claim 3, characterized in that the running wires at wire beds with a convex curving are tensioned under traction and the running wires at wire beds with a concave curving are tensioned under compression.

* * * * *